(12) United States Patent
Ishii et al.

(10) Patent No.: US 6,590,952 B2
(45) Date of Patent: Jul. 8, 2003

(54) REACTOR MANUAL CONTROL SYSTEM

(75) Inventors: Kazuhiko Ishii, Tokyo (JP); Shigeru Udono, Tokyo (JP); Koji Masui, Tokyo (JP); Masahiro Matsuda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/941,724

(22) Filed: Aug. 30, 2001

(65) Prior Publication Data

US 2002/0122520 A1 Sep. 5, 2002

(30) Foreign Application Priority Data

Oct. 31, 2000 (JP) ..................................... 2000-332598

(51) Int. Cl.$^7$ ............................................. G21C 17/12
(52) U.S. Cl. ........................ 376/259; 376/230; 376/231; 376/216; 376/219; 340/500; 340/517; 340/523; 340/524; 340/535; 340/825.04; 340/10.51; 340/10.52; 364/167.02; 364/528.21; 91/35; 91/358; 91/521; 91/522; 91/526; 92/8; 92/9; 341/1; 341/50
(58) Field of Search .................. 376/230, 231, 376/259, 216, 219; 340/500, 517, 523, 524, 535, 825.04, 10.51, 10.52; 364/167.02, 528.21; 91/35, 358, 521, 522, 526; 92/8, 9; 341/50, 1

(56) References Cited

U.S. PATENT DOCUMENTS

| | | | | |
|---|---|---|---|---|
| 3,793,141 A | * | 2/1974 | Ball ............................ | 137/814 |
| 3,796,890 A | * | 3/1974 | Thompson et al. ............ | 307/24 |
| 3,931,500 A | * | 1/1976 | Berkebile et al. ............ | 376/215 |
| 4,263,580 A | * | 4/1981 | Sato et al. ................... | 340/3.51 |
| 4,584,165 A | * | 4/1986 | Wilson et al. ............... | 376/216 |
| 4,690,794 A | * | 9/1987 | Onodera ...................... | 376/230 |
| 4,843,537 A | * | 6/1989 | Arita et al. .................. | 376/215 |
| 5,128,093 A | * | 7/1992 | Ose .............................. | 376/219 |
| 5,392,320 A | * | 2/1995 | Chao ........................... | 376/215 |
| 5,581,586 A | * | 12/1996 | Sunami et al. ............... | 376/215 |
| 5,581,587 A | * | 12/1996 | Satoh et al. ................. | 376/219 |
| 5,963,610 A | * | 10/1999 | Falvo et al. ................. | 376/240 |
| 6,049,578 A | * | 4/2000 | Senechal et al. ............ | 376/215 |

FOREIGN PATENT DOCUMENTS

| | | | |
|---|---|---|---|
| JP | 0048690 | * | 3/1984 |
| JP | 9151090 A | * | 8/1984 |
| JP | 10-319171 | | 12/1998 |
| JP | 10-319171 A | * | 12/1998 |

* cited by examiner

Primary Examiner—Michael J. Carone
Assistant Examiner—John Richardson
(74) Attorney, Agent, or Firm—Crowell & Moring LLP

(57) ABSTRACT

In a boiling water reactor controlling each control rod hydraulically by driving a solenoid valve, the control system comprises an operation control means 41 having a duplicated data processing unit for generating sequence patterns based on the timing of the driving sequence based on the control information provided manually, a transmission control means 42 for creating a command word corresponding to each control rod being controlled based on said sequence pattern, and mutually communicating each command word between duplicated data processing units and computing the AND logic of said data within a predetermined time difference, and when the computed result coincide, transmitting the selected command word serially; a transmission unit 32 for receiving said command word and performing protocol conversion thereto, and transmitting the same to a plurality of transmission branch units positioned downstream as the control command; and a solenoid valve drive circuit 31 for driving the control rod drive unit corresponding to each rod branched from said transmission branch units.

7 Claims, 18 Drawing Sheets

(a) Control rod drive timer operation time chart
(example of one notch withdrawal operation)

(b) Data in memory (content changes as time passes)

| Control data of selected operated rod | Direction control solenoid valve command code (insertion command) | Direction control solenoid valve command code (settle command) |

Elapsed time (a)

(b)

REACTOR MANUAL CONTROL SYSTEM

FIELD OF THE INVENTION

The present invention relates to improving the reliability of a manual control system for controlling the control rod of a nuclear reactor, and the method for replacing the same.

DESCRIPTION OF THE RELATED ART

Heretofore, in a boiling water reactor, a system is proposed that applies a controller to a reactor manual control system and a rod position information system for controlling the hydraulic drive of the control rod, and realizes the desired functions through software processing. One example of the prior art system is the Advanced RMCS and RPIS (ICON, 71997th International Conference on Nuclear Engineering, Tokyo, Japan, Apr. 19–23, 1999). Further, Japanese Patent Laid-Open Publication No. 10-319171 discloses a surveillance function in a rod position monitoring system equipped with a rod controller and a position monitor controller that utilizes software processing.

SUMMARY OF THE INVENTION

In an existing boiling water reactor (BWR) plant, a hydraulic drive method is applied to drive the control rod. Therefore, a system in which a controller is applied for the reactor manual control system and the rod position information system so as to control the hydraulic drive of the control rod and to realize the functions through software processing is developed supposing that the system is to be applied to the existing plant. However, according to the prior art mentioned above, there is no actual consideration on how to introduce the system realizing the functions through software processing to the actual nuclear plant.

Moreover, the conventional system operating today performing hydraulic drive control of the control rod is composed of a special-purpose electronic circuit for realizing its function, or in other words, it is composed of hardware only. However, there is no sufficient consideration on how to rationally replace the conventional hardware with a rod control monitoring device that requires software processing.

Based on the problems of the prior art mentioned above, the object of the present invention is to provide a reactor manual control system that enables to easily replace the conventional system with the system realizing the necessary function through software processing. Another object of the invention is to provide a reactor control system that enables to control the control rod corresponding to the switching between automatic and manual control.

In order to achieve the above objects, the present invention suppresses the range of the duplex system when creating the software for controlling the reactor control rod, and further utilizes the conventional units that have interface with the machine system of the control rod driving device, which enables to partially replace the existing system with the new system.

The present system comprises an operation control means that processes (determines) the timing of the drive sequence at a duplicated data processing unit; a transmission control means that performs an AND logic within a predetermined period of time by receiving the duplicated data at another duplicated data processing unit and mutually transmitting data, and when said AND logic is fulfilled, selects one data and transmits said data; a transmission means that receives said data and performs protocol conversion so as to generate a serial transmission command and to transmit them serially to a plurality of transmission branch portions positioned downstream; and a control rod drive means that is branched from said branch portion and drives said control rod.

The serial transmission command is discriminated for each control rod including the synchronizing bit, the address of the control rod, and the excitation command for the solenoid valve, so the interface of the control rod drive means or control rod drive mechanism can be set similar to the prior art.

The rod position information system is also basically similar in structure. The position input system inputs the control rod position from the rod position detecting mechanism, and the position transmission means connected to each position input system via the branch portion transmits the position signal upstream, which is distributed through mutual transmission within the data processing unit. The position monitor system displays one of the control rod positions that had gone through software processing in the duplicated system. Here, the interface of the position detecting device or position detecting mechanism is similar to that of the conventional system.

Moreover, the reactor manual control system according to the present invention is characterized in that said rod control system is renewed with a control cabinet having a duplicated data processing unit of a microcomputer, and only the transmission system is further renewed that performs protocol conversion within the control cabinet of the control rod drive system. The control rod position monitor system is similar in that the cabinet of the control rod monitor device is renewed but only the position transmission system is renewed in the cabinet of the position input system.

DETAILED DESCRIPTION OF PREFERRED EMBODIMENTS

The embodiments of the present invention will now be explained. Throughout the drawings, the same components are designated with the same reference numbers.

Figure 1:
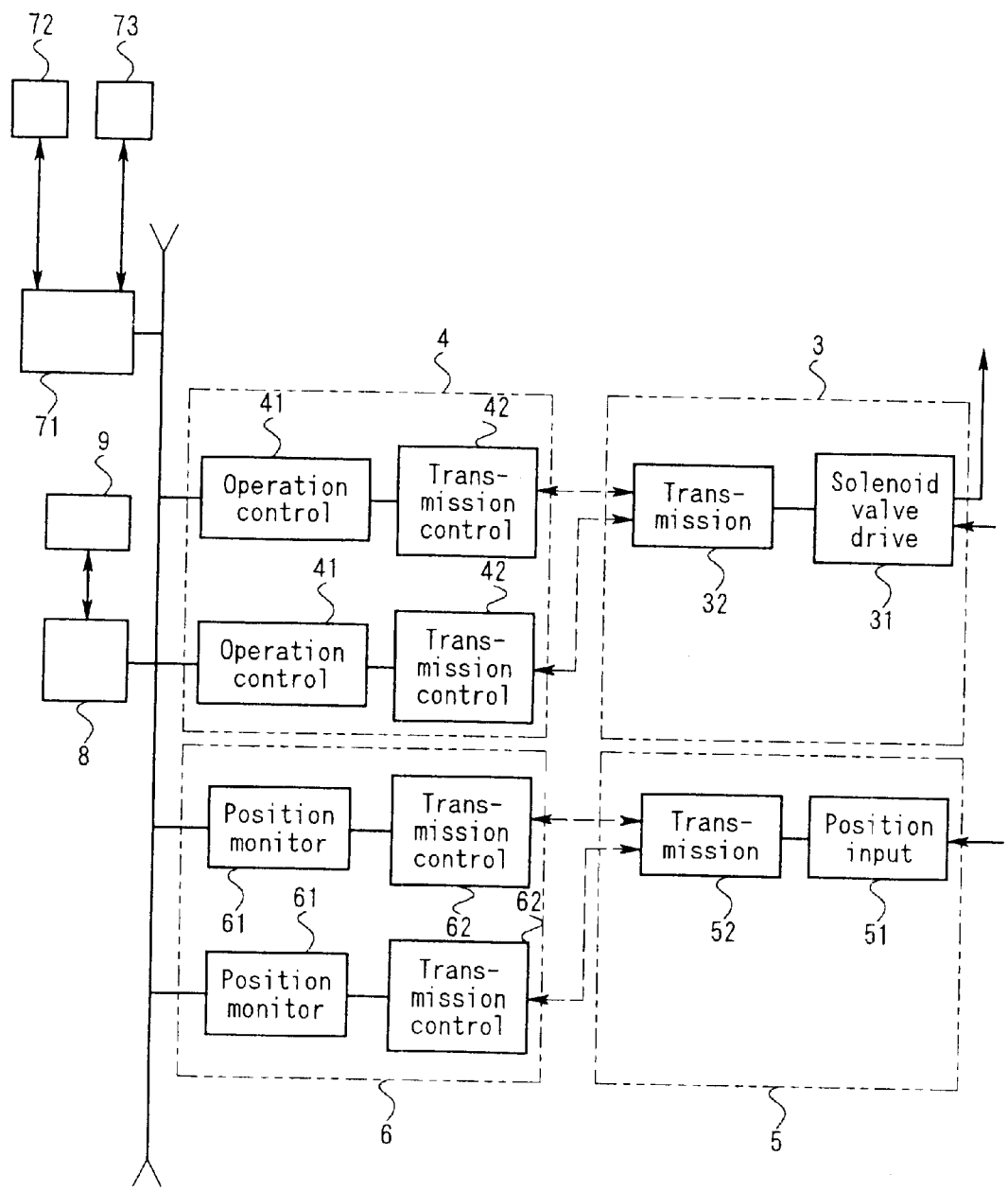
FIG. 1 is a block diagram of the reactor manual control system according to one embodiment of the present invention.

FIG. 1 shows the system structure of the reactor manual control system according to one embodiment of the present invention. In a reactor 1, plural control rods 2 for controlling the output power of the reactor are equipped, the number of which corresponding to the reactor output, which for example is 185 in the case of a nuclear plant of the 1100 MWe class.

A control rod drive unit 3 of the rod control system controls the opening/closing of four direction control solenoid valves mounted to a control rod drive mechanism 21 via a transistor contact of a solenoid valve drive circuit 31 which is in the form of cards corresponding to each control rod. Insertion or withdrawal of the control rod 2 is performed corresponding to hydraulic pressure either continuously or by notches (movement unit of the control rod that is locked automatically).

This operation is performed using a display/operation unit 72 and a switch-lamp circuit 73 equipped to the main console of the central control cabinet. For example, the display/operation unit 72 having a touch-operation function displays a rod selection switch for the full core, and one rod is selected as the object of operation by touching the screen. Thereafter, the switch of the switch-lamp circuit 73 existing as a hard switch is operated. In the case of a notch operation, the insertion or withdrawal switch is pressed down for any chosen period of time while observing the position information output from the control rod monitoring device 6. Further, when performing a continuous insertion operation, a switch for emergency insertion is pressed, and when performing a continuous withdrawal operation, the continuous withdrawal switch and the withdrawal switch are operated simultaneously.

The above-mentioned operation information is transmitted as data to a rod control unit 4 through a display control unit 71, and each operation control means 41, which are duplicated data processing units, determines whether control is possible or control is rejected based on the interlock signal input from associated systems such as a neutron monitoring system and the like. Thereafter, operation command is output in the form of a timing sequence pattern for controlling the opening/closing of the direction control solenoid valve based on the above mentioned operation information.

Based on this timing sequence pattern, the transmission control means 42 creates a frame of the transmission data having the address information of the control rod being the object of operation and the excitation information of the direction control valve (withdrawal supply valve excitation command, insertion valve excitation command, withdrawal discharge valve excitation command) as the command word. The frames of the transmission data are mutually transmitted between duplicated transmission control means 42a and 42b, and when they coincide upon parameter comparison, they are cyclically transmitted by high speed to the transmission unit 32 of the control rod drive unit 3 from each transmission control means 42a, 42b.

In the transmission unit 32, protocol conversion is performed to the received transmission data, and serial signals corresponding to each control rod are generated including the transmitted synchronizing bit information, the address information for identifying the solenoid valve drive circuit that is in a one-to-one relation with the control rod, and the excitation information of the solenoid valve, which are put into the transmission frame that is a special protocol for down stream transmission, before transmitting the same to a solenoid valve drive circuit 31 equipped with a card corresponding to each control rod. The solenoid valve drive circuit 31 selects a card corresponding to the address information of the control rod being the object of operation that is included in the serial signal. The solenoid valve drive unit 31 outputs a transistor contact signal for controlling the opening/closing of the direction control solenoid valve based on the excitation information (withdrawal supply valve excitation command, insertion valve excitation command, withdrawal discharge valve excitation command) of the direction control valve included also in the serial signal.

Next, the control rod monitor system is explained. The position detection mechanism 22 of the control rod 2 comprises a total of 54 reed switches including the 25 reed switches designating the even positions of the notches. The contact signals of each switch are input to the position input circuit 51 of the position input unit 5, each contact signal being the coded information corresponding to the 11-wire cable.

This position information goes through a protocol conversion into an address of a resister in the position input circuit 51 corresponding to each rod based on a control rod coordinate map of the full core equipped to the position transmission unit 52, to which thereafter is taken in the coded information of the reed switch being accessed as serial signals. This position information is transmitted as data to the duplicated transmission control unit 62, and it is taken into the position monitor unit 61 which is a duplicated data processing unit. Further, this data is transmitted to the display control unit 71 where it is edited as screen data before being displayed in position for example on the display/operation unit 72 equipped to the main console of the central control room.

The operation and status display mentioned above is performed using the display/operation unit 72 equipped to the main console of the central control room and the switch-lamp circuit 73. Further, the cabinets of the rod control unit 4 or the rod monitor unit 6 are also equipped with a display control unit 8 and a display/operation unit 9 having a function similar to that of the main console of the central control room, so these can also be used.

Figure 2:
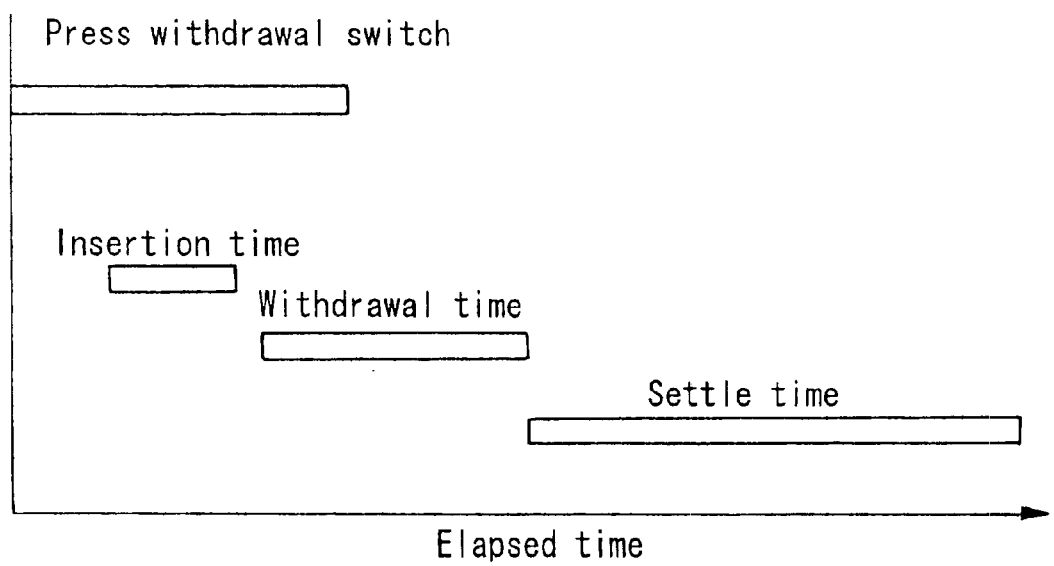
FIG. 2 is a time chart of the control rod operation.

FIG. 2 shows one example of a control command data of the data processing unit. The present embodiment shows a one-notch operation. In a one-notch withdrawal operation, the withdrawal switch is pressed for any desired period of time while monitoring the position information output from the rod monitor unit 6. The information is input to the data processing unit of an operation control unit 4 comprising two systems, and the sequence movement of a control rod drive timer is started so as to control the opening/closing of the direction control solenoid valve corresponding to the one-notch withdrawal of the control rod.

FIG. 2(*a*) shows an example of the one-notch withdrawal operation, and according to the sequence, an insertion timer is operated for a predetermined short period of time in order to remove the latch mechanically at the present position. Next, a withdrawal timer corresponding to a single notch is operated. Then, a settle timer is operated in order to mechanically latch the control rod position.

According to this sequence, the timing is controlled by software. As shown in FIG. 2(*b*), only during the time the insertion timer, the withdrawal timer and the settle timer are operating, the excitation information of the direction control valve (withdrawal supply valve excitation command, insertion valve excitation command, withdrawal discharge valve excitation command) corresponding to the address information of the control rod being the object of operation is set in the memory.

The above-mentioned operation is similar for other operation patterns such as the continuous withdrawal, and the sequence movement of the control rod drive timer is set in advance so as to enable the movement of the machine system according to the operation pattern. Similarly, the excitation information of the direction control valve is set in the memory, the timing of which is controlled by software.

Figure 3:
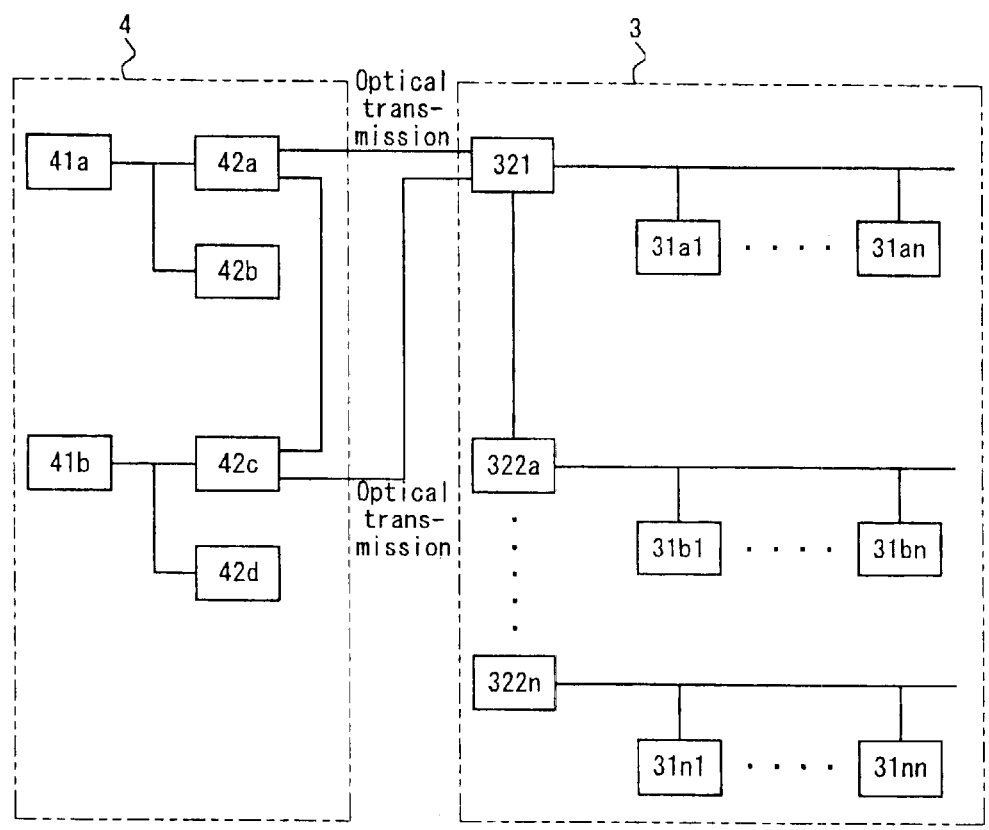
FIG. 3 is a block diagram showing one embodiment of the hardware structure of the system for controlling the operation of the control rod.

FIG. 3 shows the hardware structure of the rod operation control system according to one embodiment of the present invention. Operation control means 41*a* and 42*a* which are duplicated data processing units of the rod control unit 4 are connected to transmission control means 42*a* and 42*b*, and transmission control means 42*c* and 42*d*, respectively.

The related devices of the control rod drive mechanism 21 are divided into two groups, which are positioned respectively on opposite areas of the plant with the reactor in the center. Therefore, in order to facilitate cable connection, the control rod drive unit 3 is also divided into two groups and positioned accordingly. The structure of the cabinet mounting the control rod drive unit 3 is explained later with reference to FIG. 17, and in the actual plant they are divided into arrangements of group A and group B.

FIG. 3 shows only the transmission from the transmission control unit 42*a*, 42*c* via two optical transmission lines to one group of the control rod drive unit 3. Actually, there exist other connections from the transmission control unit 42*b*, 42*d* via optical transmission lines to the other group of the control rod drive unit 3. Upon receiving the data from the transmission control unit 42, a transmission unit 321 with transmission/reception ports performs protocol conversion, and creates serial signals having a transmission frame structure that is a special protocol for downstream transmission, and transmits the signals to each solenoid valve drive circuit 31 connected through a multi-drop connection. The transmission units 322*a* through 322*n* is a branch unit that relays the signals from the transmission unit 321 to the transmission units positioned downstream, and also branches and is connected to a plurality of solenoid valve drive circuits that belong to its own group. The following is an explanation on the method for transmitting data from the operation control means 41 and transmission control means 42*a*, 43*c* to one group of the control rod drive unit 3.

Figure 4:
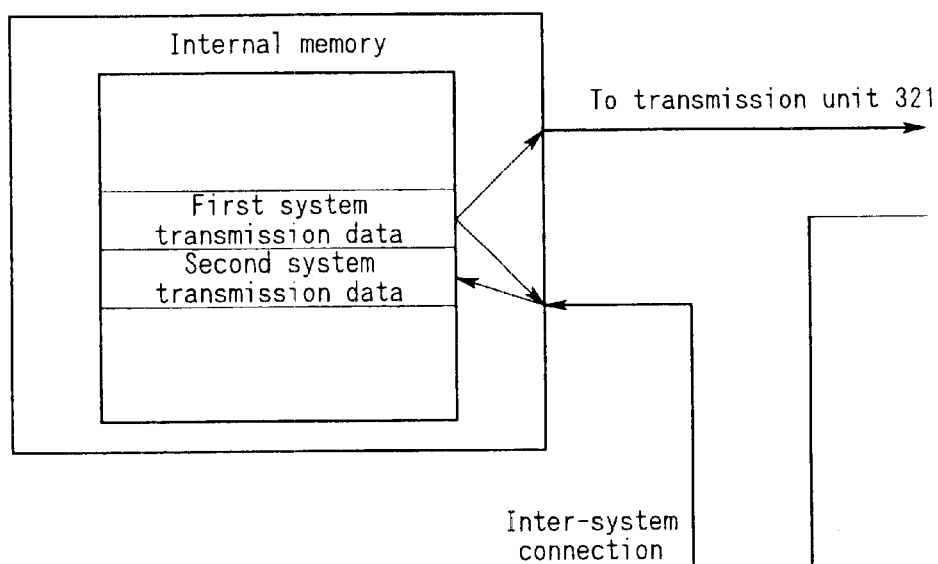
FIG. 4 is a block diagram of the inner memory and the inter-system connection of the transmission control device (42)
Figure 4:
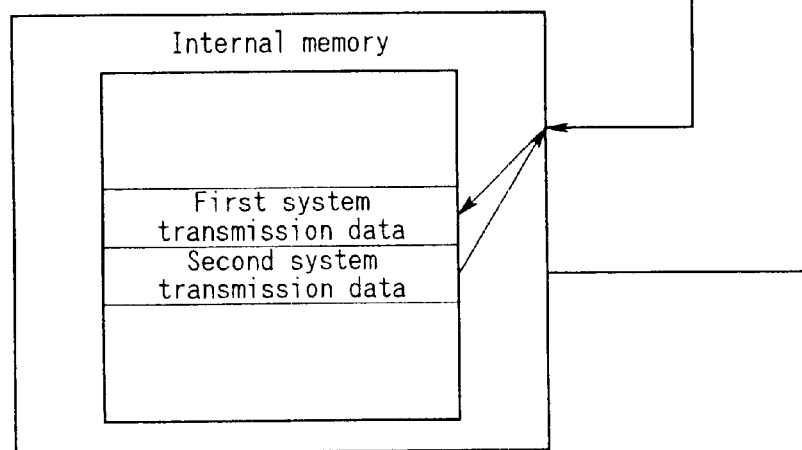

FIG. 4 shows the internal memory and inter-system connection of the transmission control unit. The transmission control means 42*a* (first system) and 42*c* (second system) each comprises an internal memory. The internal memory of the transmission control means 42*a* stores a first system transmission data that is the control command data of the data processing unit of its own system, and a second system transmission data that is the control command data transmitted via the inter-system connection from the internal memory of the transmission control means 42*c*.

The data processing units of the transmission control means 42*a* and 42*c* perform an AND (and logic) process to the two logical control command data of the transmission data of these two systems, and since these data are actually generated a synchronously, if it is determined after removing the displacement caused by the asynchronisity that the data contents coincide, one of the two means 42*a* or 42*c* is selected, which is transmitted cyclically by optical data transmission via the optical transmission line connected to the transmission control means 42*a* to the transmission unit 321 for example by an HDLC communication protocol.

When an error occurs for example at the upstream data processing unit according to this AND logic, the transmission data will not be transmitted to the transmission unit 321. In this case, a bypass operation is performed according to the present embodiment, in which the transmission data which is a control command data generated at the normally operating system is transmitted to the transmission unit 321. The bypass information is also monitored at the transmission unit 321, and the data transmitted corresponding to the bypass operation is monitored.

The transmission unit 321 with ports that is equipped with two transmission/reception ports receive the data (command word) transmitted from a system selected from the two transmission units 42*a* and 42*c*, or the data transmitted corresponding to the bypass operation. After performing a protocol conversion process to the received command word, the data is transmitted as a serial signal to transmission units 322*a* through 322*n* and solenoid valve drive circuits 31*a*1 through 31*an* connected thereto through multi-drop connection.

Figure 5:
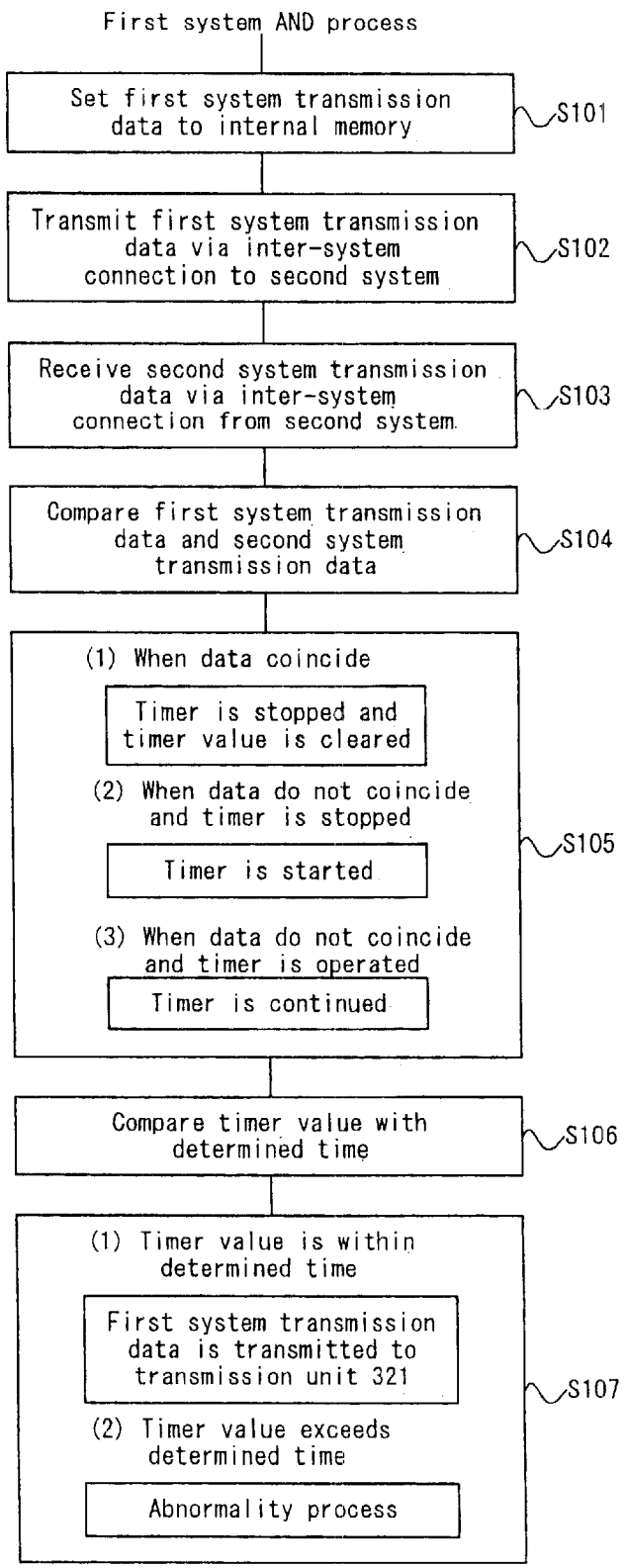
FIG. 5 is a flowchart showing the AND (AND logic) process.

FIG. 5 shows a flowchart of the AND (AND logic) process of the first system. The transmission data of the first system is set to the internal memory (s101), the first system data is transmitted via the inter-system connection to the second system (s102), the second system data is received via the inter-system connection (s103), and the first system transmission data and the second system transmission data are compared (s104). If as a result of the comparison the first system transmission data correspond with the second system transmission data the timer is stopped and the timer value is cleared (s105-(1)), but if the data do not correspond, the timer is started if the timer has been stopped (s105-(2)), and the timer is continued when the timer has been operating when the data did not correspond (s105-(3)).

Next, the timer value is compared with a determined period of time set in advance (s106), and if the timer value is still within the defined time the first system transmission data is transmitted to the transmission unit 321 (s107-(1)). If the timer value exceeds the defined time, abnormality process is performed (s107-(2)). That is, the first transmission data is transmitted to the transmission unit 321 via the transmission line connected to the transmission control means 42*a* of FIG. 4. In this case, data is not transmitted to the transmission line connected to the transmission control means 42*c*. When the first system transmission data and the second system transmission data do not correspond to each other within the defined time, abnormality is notified to the data processing unit of the first system, and an alarm is output by a self test process. The sequential AND process mentioned above is performed similarly for the second system.

Figure 6:
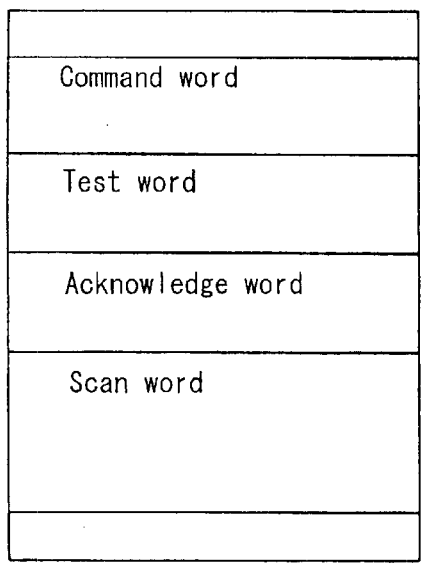
FIG. 6 is an explanatory view showing the transmission data table between a transmission control unit and another transmission control unit.

FIG. 6 shows the format of the transmission data transmitted between a rod control unit and a rod drive unit. Data having this format is cyclically transmitted optically between the transmission control unit 42a and the transmission unit 321 by a communication protocol of HDLC and the like. This format includes the transmission data from the transmission control unit 42a to the transmission unit 321 and the transmission data transmitted in the opposite direction.

The data transmitted from the transmission control unit 42a to the transmission unit 321 includes a command word for controlling the direction control solenoid valve of the rod drive mechanism 21 and the test word for sequentially checking the disconnection of the direction control solenoid valve of all the control rods based on the operation at the display/operation unit 72 and the switch-lamp circuit 73.

Moreover, the data transmitted in the opposite direction includes in the frame as the information on the status corresponding to the selected control rod of the command word an acknowledge word including the bit information showing the address of the control rod or the bit information showing the excitation status of the direction control solenoid valve, and a scan word including the status information of the equipment related to the scram movement of the rod drive mechanism 21 scanned and taken in based on the coordinate map information of all the control rods.

Figure 7:
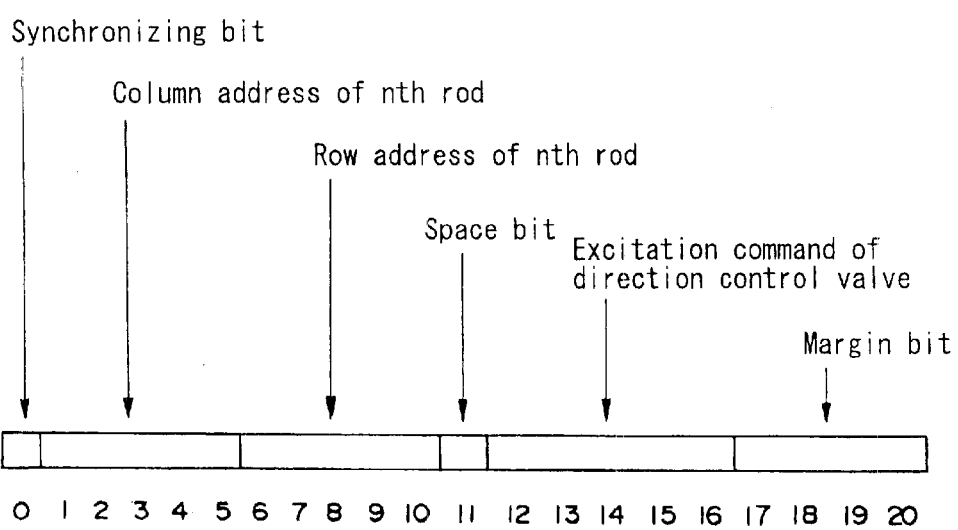
FIG. 7 is an explanatory view showing the frame structure of the serial signal between a transmission unit and a solenoid valve drive circuit.

FIG. 7 shows the frame structure of the serial signal between the transmission unit and the solenoid valve drive circuit. The frame of the command word basically includes a synchronizing bit for synchronizing the transmission, the bit information designating the address of the control rod, and the bit information showing the excitation command of the direction control solenoid valve.

The acknowledge word has a similar frame structure, wherein the frame basically includes a synchronizing bit for synchronizing the transmission, the bit information showing the address of the control rod, the bit information showing the excitation status of the direction control solenoid valve, and the status information of the equipment related to the scram movement of the control rod drive mechanism 21.

Figure 8:
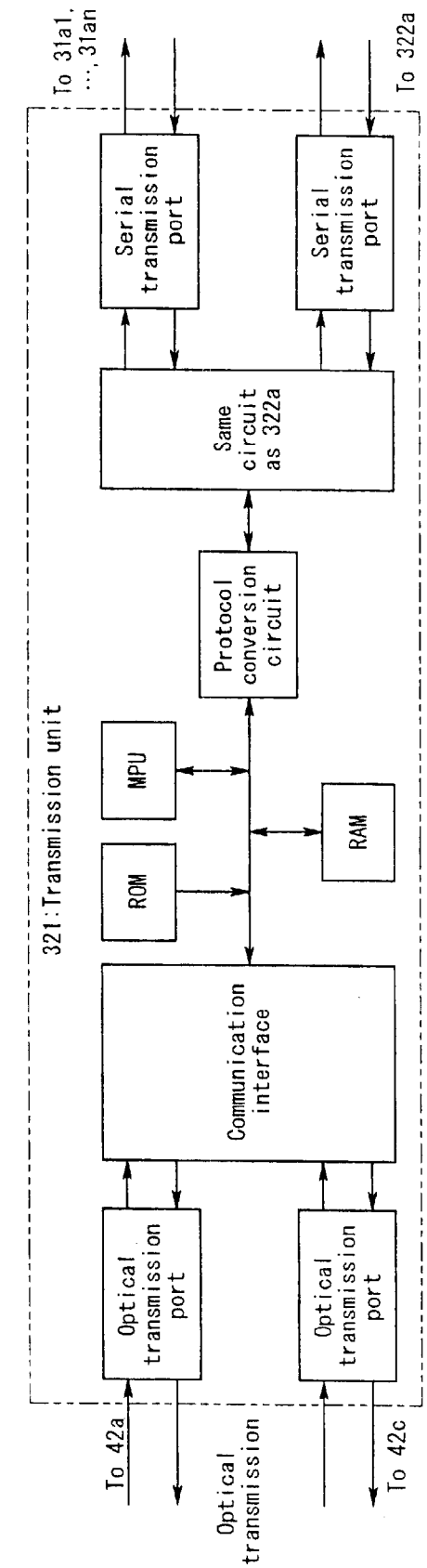
FIG. 8 is a block diagram of the transmission unit (321)

FIG. 8 shows the circuit structure of the transmission unit equipped with ports. The frame of the serial signal is performed of the protocol conversion process by the transmission unit 321 with ports. For example, the data transmitted from the transmission control means 42a by the HDLC protocol is received at the optical transmission port before being transferred to the RAM memory through a communication interface. The associated data on the memory is transferred to the protocol conversion circuit at a cyclic timing determined according to data units such as bytes. In the protocol conversion circuit, the array of bit information is reconstituted corresponding to the frame structure of the serial signal. The protocol-converted data is transmitted as serial signals to the transmission units 322a ... 322n and the solenoid valve drive circuits 31a1 ... 31an positioned downstream.

Figure 9:
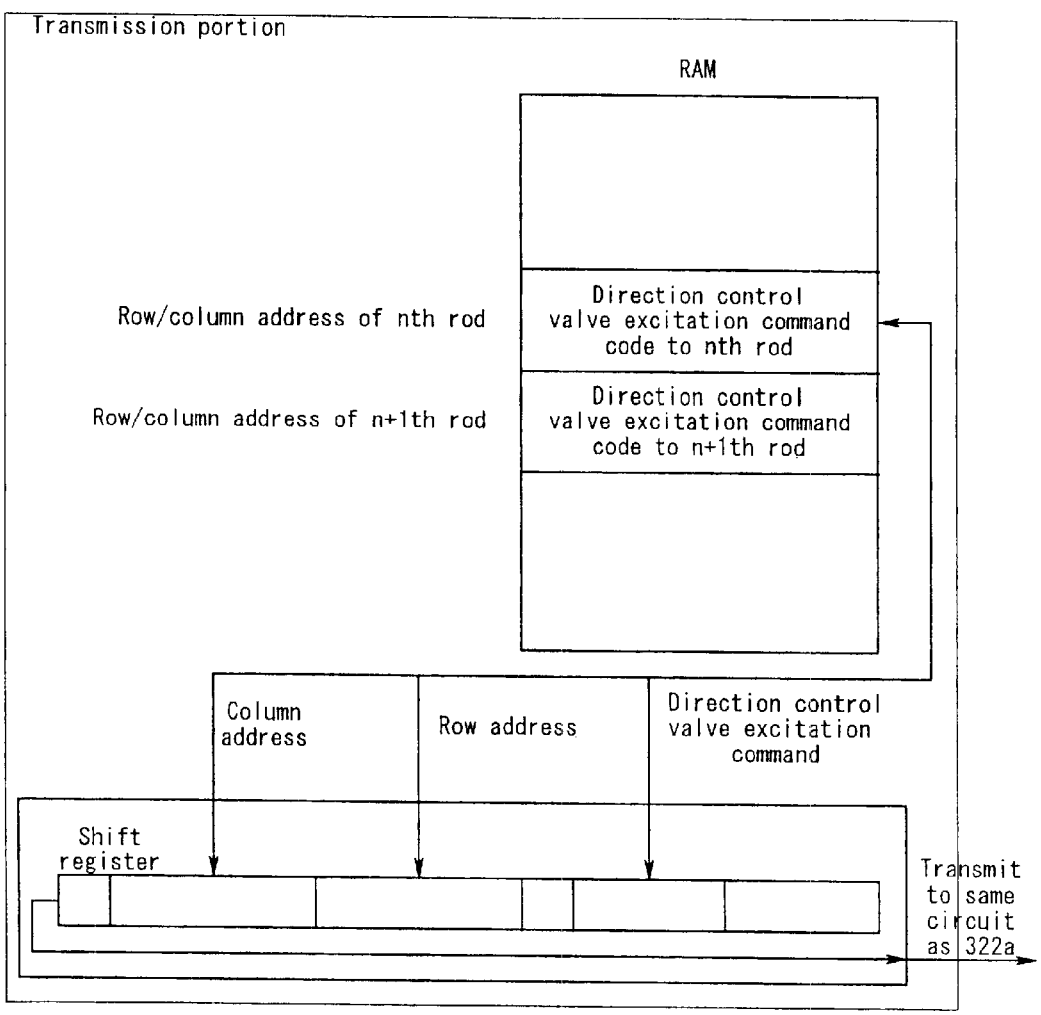
FIG. 9 is a block diagram of the transmission portion of the protocol conversion in the transmission unit (321)
Figure 10:
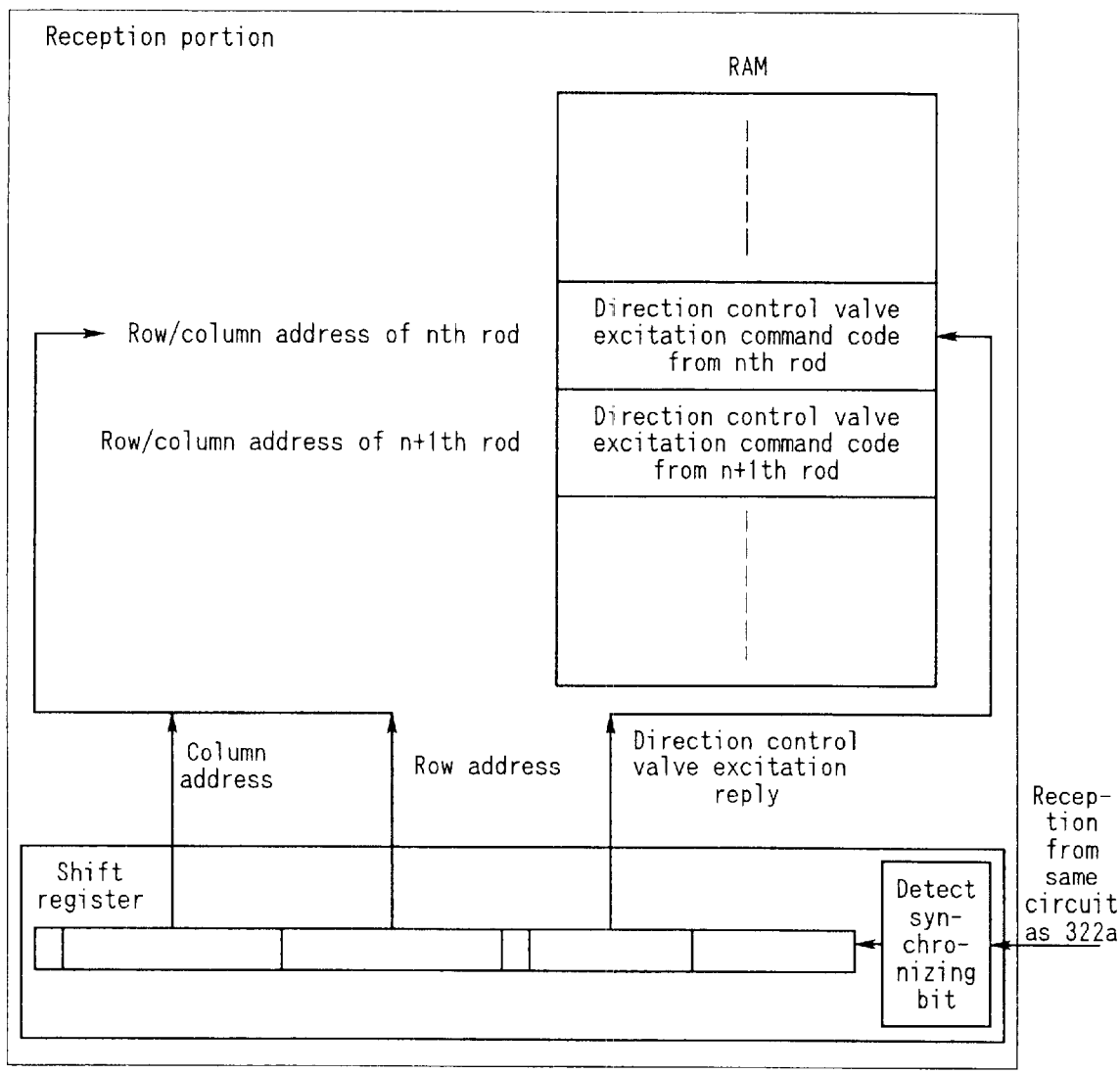
FIG. 10 is a block diagram showing the receiving portion of the protocol conversion in the transmission unit (321)
Figure 11:
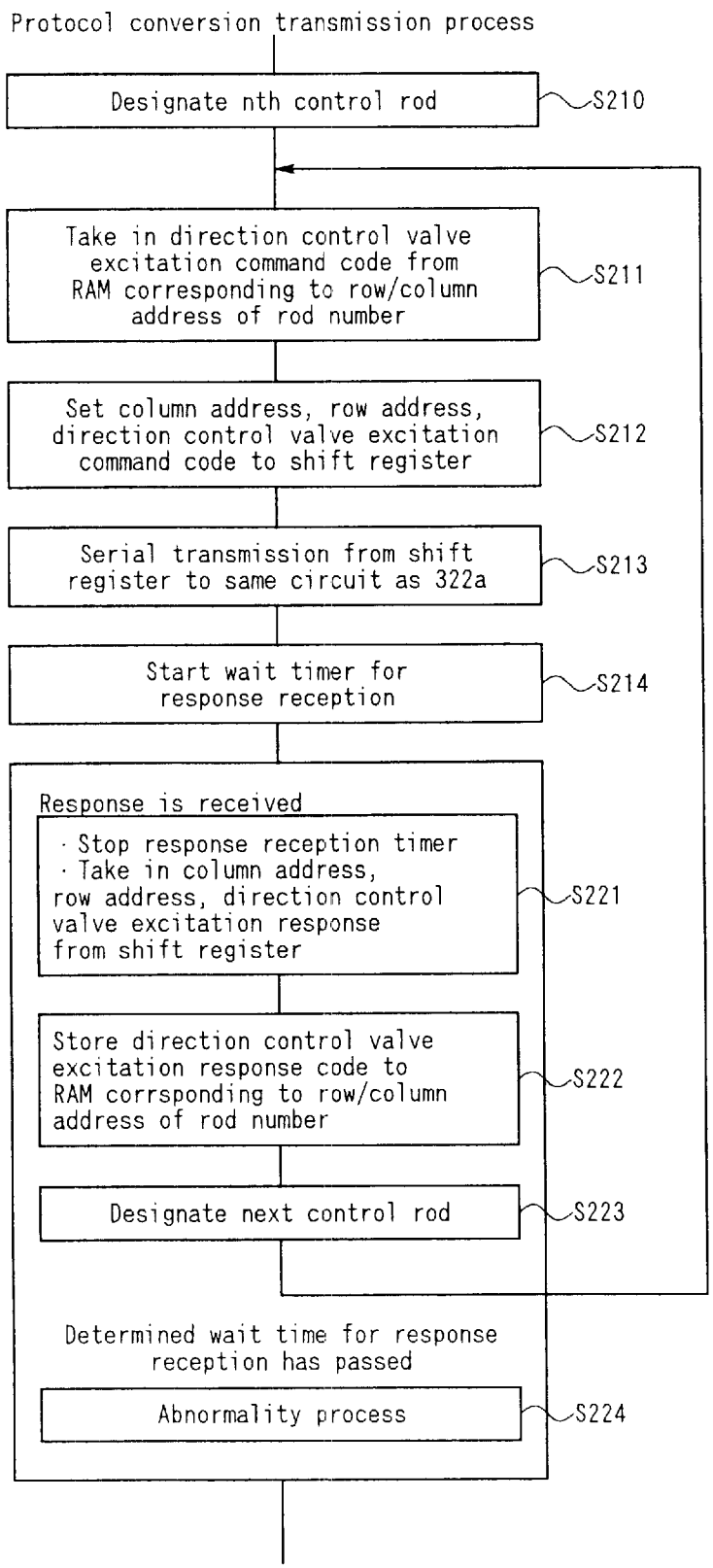
FIG. 11 is a flowchart showing the protocol conversion transmission process.

The protocol conversion performed in the transmission unit 321 with ports will now be explained. FIG. 9 shows the structure of the transmission unit, and FIG. 10 shows the structure of the reception unit. The protocol conversion/serial transmission process of the transmission unit 321 is performed at the MPU (micro-processing unit) based on a program stored in the ROM of the transmission unit 321. FIG. 11 shows the process flow of this program.

The transmission units 322a through 322n positioned downstream from the transmission unit 321 and each having a function of branching the connection to solenoid valve drive circuits that belong to its own group and that are connected through multi-drop connection and a function of relaying the connection to transmission units positioned downstream there from are each equipped with three serial transmission ports similar to the example shown in FIG. 10. The command word which is a control command transmitted from upstream is received through one of the three ports, which passes through a branch circuit and transmitted to plural solenoid valve drive circuits that belong to its own group through another port, while being transmitted through the other port to a transmission unit 322 positioned downstream.

Further, the acknowledge word and the scan word transmitted in the opposite direction are received from the plural solenoid valve drive circuits that belong to its own group via one of the three serial transmission ports, and are further received from a transmission unit positioned downstream through another port. These words are passed through a composite (theoretically, an OR) circuit, then transmitted to the transmission unit 322 or 321 positioned upstream via the other port.

When transmitting the data to the same circuit as 322a of FIG. 8, after designating the nth control rod (s210), the direction control valve excitation command code for the nth control rod is input from a RAM corresponding to the row/column address of the control number, and the column address, the row address and the direction control valve excitation command code are set to the shift register (s212). Then, the data is transmitted from the shift register to the same circuit serial as 322a (s213), and the response reception wait timer is started (s214).

That is, the direction control valve excitation command code for each control rod is loaded simultaneously at a determined timing of a clock cycle to the shift register corresponding to the transmission data format as shown in FIG. 7, and at the same time, the bit data as the element is shifted corresponding to the clock movement, and is transmitted to the same circuit as 322a as serial signals.

On the other hand, when receiving data from the same circuit as 322a, upon receiving the response, the response reception wait timer is stopped, and the column address, the row address, and the direction control valve excitation response are taken in from the shift register (s221). Then, the direction control valve excitation response is stored in the RAM corresponding to the row/column address of the control rod number (s222), and the process returns to s211 after designating the next control rod (s223). Further, abnormality process is carried out when no response is received during the determined wait time for response reception (s224).

As explained, the serial signals of the transmission data format shown in FIG. 7 is taken into the shift resister in order according to the clock movement. At the timing when the data corresponding to the transmission data format is set to the shift register by the synchronizing bit detection circuit, the data having meaning corresponding to the transmission data format is stored in the RAM of the transmission unit 321 corresponding to each control rod as the direction control rod excitation command code for each control rod.

The serial signals transmitted to the transmission branch unit has a data structure that is compatible with a special-purpose electronic circuit formed without including any software processes, so the interface with the control rod drive mechanism 21 can be the same as the prior art system. In other words, the protocol of the interface is the same as the conventional system.

In a protocol conversion transmission process, the transmission process and the reception process is executed sequentially corresponding to all the control rods, and when the data from the downstream side exceeds the determined wait time for response reception, the abnormality process is carried out. The abnormality information is transmitted to the data processing unit positioned upstream, and an alarm is output according to a self test.

The present system basically characterizes in generating a control command data at each of the duplicated data processing units, and an AND operation is performed to select one control command data, which is finally utilized for controlling the operation of each of the control rods. However, the present invention also takes into consideration the malfunction of the duplicated portion, and it also comprises a function to generate the control command data based on a single system while bypassing the other system, and controlling the operation of each control rod according to this data.

Figure 12:
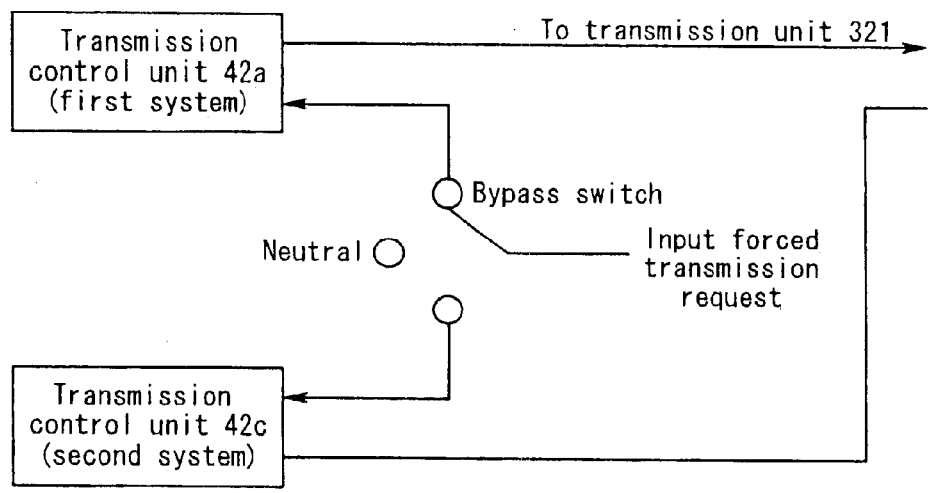
FIG. 12 is a block diagram showing the bypass process means of the transmission control unit (42)

FIG. 12 shows a bypass function according to a transmission control unit 42. The bypass switch is equipped within the rod control unit 4, and the selected state of the bypass switch is input to the transmission control means 42a of the first system and the transmission control means 42c of the second system (and similarly to 42b and 42d) (s311). The selection of the bypass switch implies the input of a forced transmission request, and when the system is normal, the switch is at a neutral position and neither of the systems take in the forced transmission request input signal (s312-(1)), and an AND (AND logic) process is performed.

We will now consider the case where abnormality has occurred to the operation control means 41a (first system). The occurrence of abnormality is detected through a self test, and an alarm is output thereby notifying the situation to the operator, and a bypass operation (forced transmission request input to the second system) is performed. The forced transmission input process to the second system is input to the transmission control means 42c of the second system, and only the second system transmission data stored in the internal memory as shown in FIG. 4 is transmitted to the transmission unit 321 through the transmission line connected to the transmission control means 42c.

Figure 13:
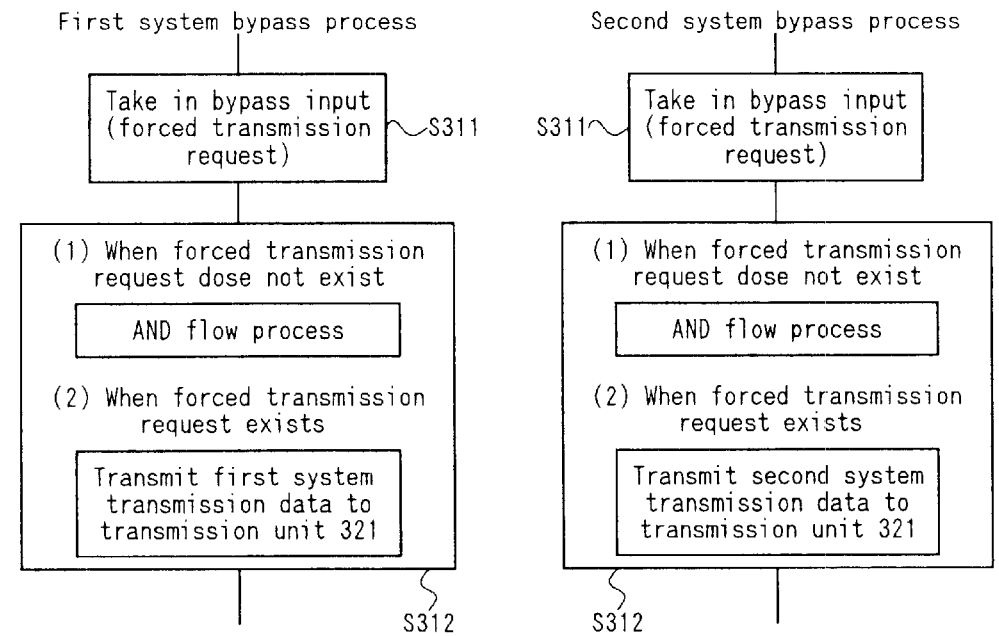
FIG. 13 is a flowchart of the bypass process.
Figure 13:
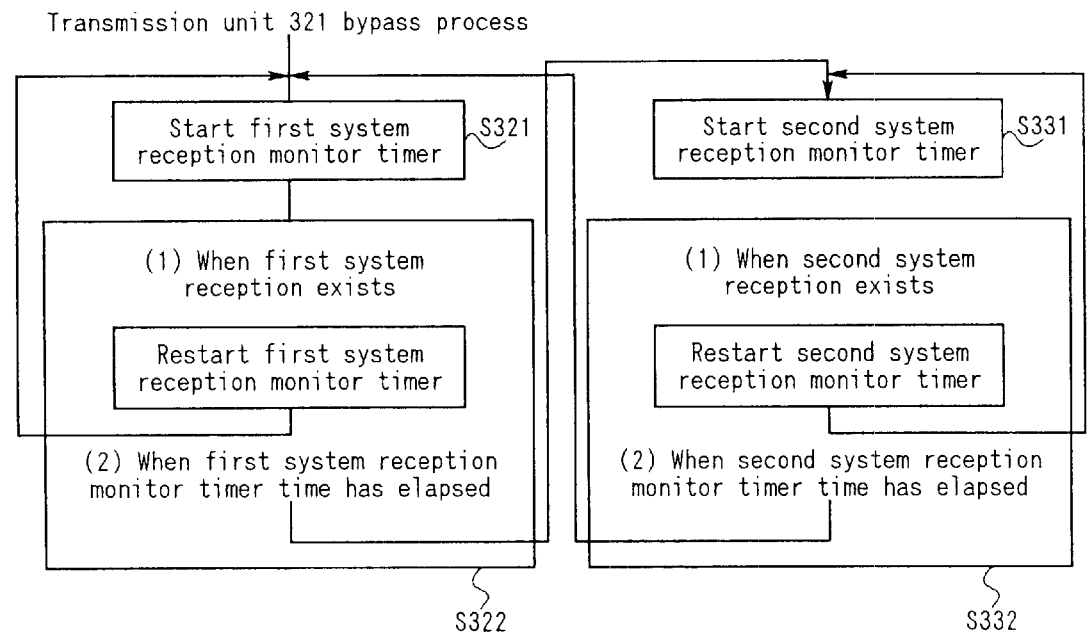

The bypass state set to the transmission control means 42a and 42c (similarly to 42b and 42d) is also monitored by the transmission unit 321 as shown in FIG. 13(*b*). During the normal state, the reception status from the first system is monitored by a first system reception monitor timer (s321), and when the transmission data is renewed at every determined cycle according to a cyclic transmission, the monitor timer restarts repeatedly (s322-(1)).

When error occurs to the operation control means 41a, the first system transmission data is interrupted, and the time of the monitor timer is elapsed (s322-(2)). In this state, the second system reception monitor timer starts (s331), and from the time the reception data is acknowledged as the second system, the second system reception monitor timer repeatedly restarts (s322-(1)). The monitoring of the first system reception and the monitoring of the second system reception are in crossed relations, and when for example the switch selection is restored from the forced transmission request input position of the second system to the neutral position, the system starts monitoring the first system transmission again.

Figure 14:
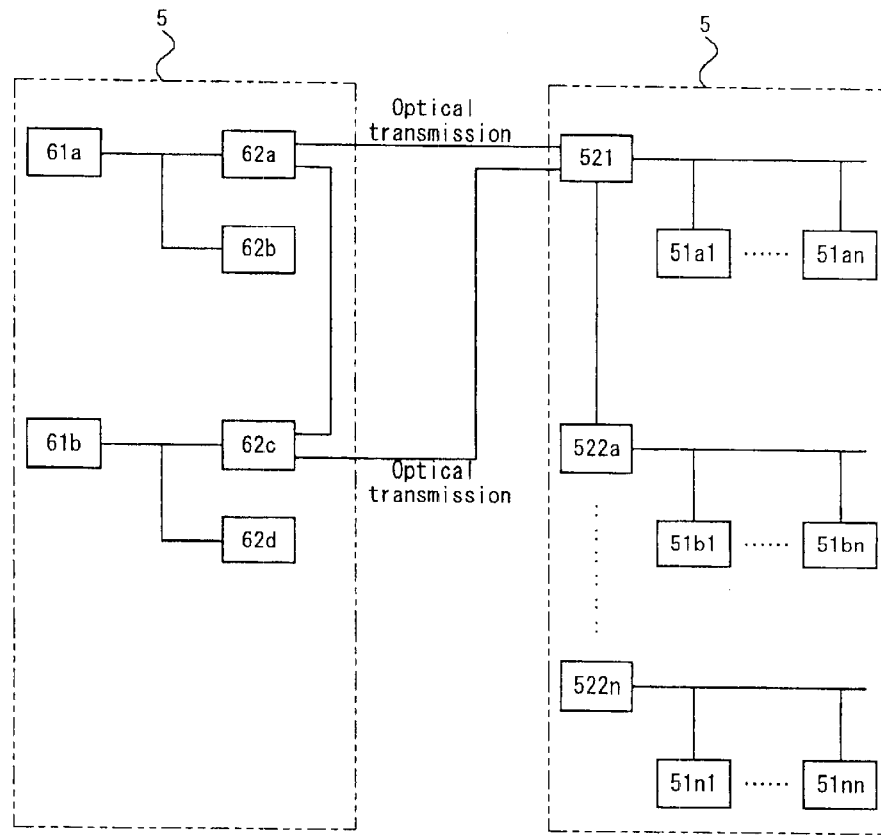
FIG. 14 is a block diagram showing one embodiment of the hardware structure of the rod position monitor system.

FIG. 14 shows the composition of the rod position monitor system. Within the control rod monitor unit 6, transmission control units 62a, 62b and transmission control units 62c, 62d are respectively connected to each of the position monitor units 61a and 61b, which are duplicated data processing units.

The devices associated with the control rod drive mechanism 21 are divided into two groups as mentioned above, and in order to facilitate the cable connection, the position input unit 5 is also often divided into two groups and arranged accordingly. The transmission control unit 62 that performs optical transmission with the position input unit 5 is also divided into two groups, the transmission control unit 62a (first system) and 62c (second system), and the transmission control unit 62b (first system) and 62d (second system).

The transmission control units 62a (first system) and 62c (second system) each include an internal memory similar to the example shown in FIG. 4, with inter-system connection created therebetween. The internal memory of the transmission control unit 62a receives a coded reed switch information of the rod position information as a position word through an optical transmission route connected to the transmission control unit 62a from a position transmission unit 521 equipped with two transmission/reception ports, the data being in the format shown in FIG. 6, which is optically transmitted cyclically by an HDLC communication protocol.

The internal memory of the transmission control unit 62a stores the first system transmission data as the position word, and the same data is also stored in the internal memory of the transmission control unit 62c through the inter-system connection.

The position word data transmitted from the position transmission unit 521 and stored in the internal memories of both the transmission control unit 62a of the first system and the transmission control unit 62b of the second system is input to the data processing units of both the first system position monitor unit 61a and the second system position monitor unit 61b, and are stored in the internal memory of each system.

According to the control rod monitor unit and the position input unit according to the present embodiment, the basic data flow is opposite at the rod control unit and the rod drive unit, but since the basic idea is to distribute and process the positional information received at the duplicated position-monitoring data-processing unit from the transmission unit 52—position input circuit 51 having a single system, the bypass function enabling a single system to process the rod position data while bypassing the other system in case malfunction (abnormality) occurs at the duplicated portion is similar.

The bypass switch is equipped within the rod position monitor unit 6, and according to a function similar to that shown in FIG. 12, the selection state of the bypass switch is input to both the transmission control means 62a of the first system and the transmission control means 62c of the second system (and similarly to 62b and 62d). The selection of the bypass switch relates to the input of the forced transmission request. During normal state where the system is operating normally, the switch is at a neutral position and neither system takes in the forced transmission request input signal.

During this state, the data transmitted from the transmission unit 521 via an optical transmission line connected to the transmission control means 62a is received by the transmission control means 62a, and through communication between the transmission control means 62a and the transmission control means 62c, the data is also transmitted to the transmission control means 62c.

Figure 15:
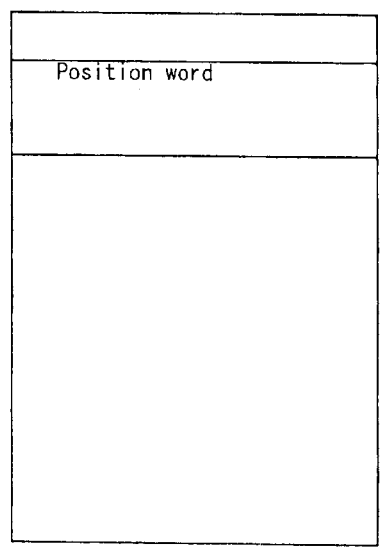
FIG. 15 is an explanatory view of the transmission data table between a transmission control unit and another transmission control unit within the rod position monitor system.

When abnormality occurs to the position monitoring means 61a (first system), the occurrence of abnormality is detected through a self test and an alarm is output thereby notifying the operator of the situation, at which point the bypass operation (input of forced transmission request to the second system) is performed. The forced transmission input process of the second system is input to the transmission control means 62c of the second system, and through an optical transmission line connected between the transmission unit 521 and the transmission control means 62c, the position word data as shown in FIG. 15 is received by the transmission control means 62c, and stored in the internal memory thereof.

The bypass state set to the transmission control means 62a and 62c (similarly to 62b and 62d) is monitored by the transmission unit 521, similar to the state shown in FIG. 13(b), and the optical transmission line of the first system or the second system is selected.

Figure 16:
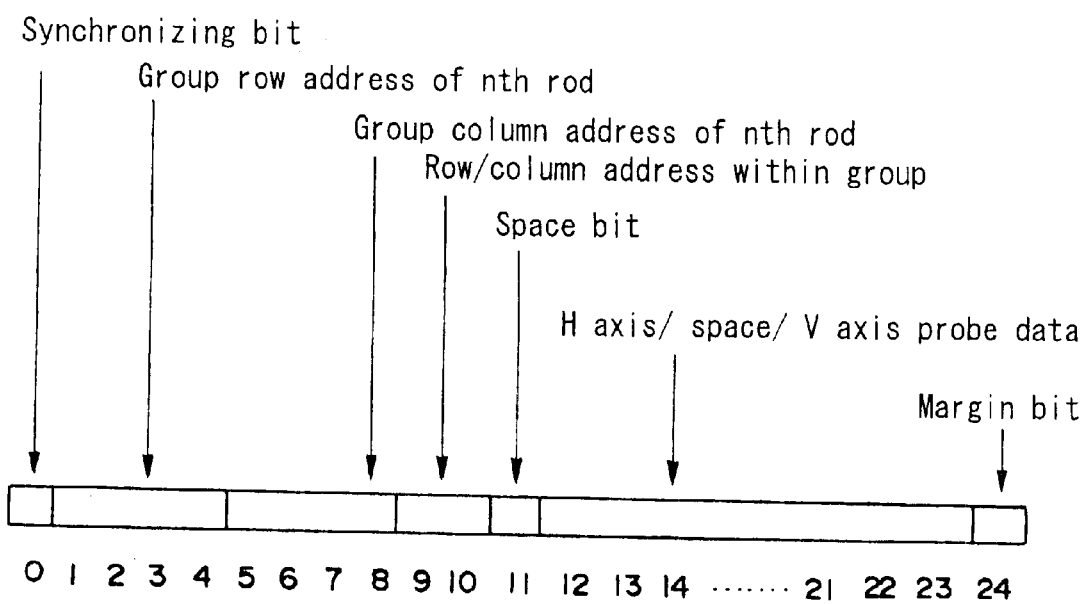
FIG. 16 is an explanatory view showing the frame structure of the serial signal between a transmission device and a position input circuit.

On the other hand, the probe word (position information) having a frame structure shown in FIG. 16 serially scanned based on the coordinate map information of all the control rods stored in the internal memory and including the bit information showing the address of the control rod and the synchronizing bit for synchronizing the transmission is transmitted as serial signals from the downstream side of the transmission unit 52 and the position input circuit 51 connected through a multi-drop connection is transmitted to the position transmission unit 521 at the side of the position input unit 5.

The frame structure of the probe word (position information) is basically similar to that of the command word explained above. The transmission frame of the probe word (position information) transmitted as serial signals from the downstream side of the position information circuit 51 and the transmission unit 52 goes through a protocol transmission process at the position transmission unit 521 before being transmitted to an upper transmission control unit 62.

Similar to the rod control system, according to this protocol transmission process, the serial signals of the transmission data format shown in FIG. 16 are sequentially input to the shift register, and when the data corresponding to the transmission data format is set to the shift register by the synchronizing bit detection circuit, the data with meaning corresponding to the transmission data format is stored to the RAM of the transmission unit 521 for example as a coded position information corresponding to the 11-wire cable for each control rod, including a code for the H-axis probe data and V-axis probe data.

The above-mentioned sequence of protocol conversion/serial transmission process is executed by the microprocessing unit based on the control of the program stored in the ROM of the position transmission unit 521. The H-axis probe data and the V-axis probe data are converted into the position word as contact signals for the 54 reed switches based on the control of the MPU.

The position monitor units 61a and 61b store the control rod position data in each internal memory as the identical position data transmitted from the position transmission unit 52. The data are respectively transmitted to a display control unit 71, 8 of the upper level by respective processes, and an asynchronous OR process of the two position data is performed theoretically. Actually for example, when no malfunction is detected by a self test according to a priority control of the master/slave defined in advance, the master system data is selected, and when malfunction is detected in the master system the data of the slave system is selected, and the selected position data is displayed on the display/operation unit 72, 9.

According to the reactor manual control system of the present embodiment explained above, the system is equipped with a rod control unit having duplicated data processing units, and the control command is duplicated and the output is performed based on the AND logic data process, so the reliability of the system is greatly improved. Moreover, during an abnormal state where the AND logic is not fulfilled, only the normal data is output according to a bypass process, so the availability of the system is improved. Moreover, since protocol conversion is performed to the transmission control means so that the data will correspond to each of the control rods, the interface with the control rod drive unit is simplified.

The replacement (equipment renewal) of the cabinet composition based on the present embodiment will now be explained. First, the conventional cabinet composition will be explained. The conventional system is realized by a special-purpose electric circuit, and there are around 39 kinds of cards (printed circuit board) that realize the system.

The rod selection control panel corresponding to the display/operation unit 72 and the switch-lamp circuit 73 of the present embodiment comprises a transmitter card, a data driver card, a resistance card, a diode array card, and a full core LED (A–C) card. On the other hand, the present embodiment realizes the system by a different hardware basically composed for example of a display/operation unit having a touch-operation function, so a whole set of associated hardware is to be replaced.

The portion corresponding to the rod control unit 4 is composed for example of an input isolator card, an activity control (A, B) card, a rod motion timing card, an analyzer (A–D) card, a fault map (A–C) card, and an output isolator (A–C) card. The rod motion timing card generates the sequence timing for opening/closing the direction control solenoid valve for the insertion or withdrawal of the control rod. On the other hand, the present embodiment realizes the system by a different hardware basically composed of a data processing unit, so a whole set of associated hardware is to be replaced.

The portion corresponding to the control rod drive unit 3 is composed for example of a branch junction card and a transponder card. The present embodiment is identical to the conventional system except for the transmission unit connected with the upper level, so application of the replacement method explained later is possible.

The portion corresponding to the display control unit 8 is composed for example of a buffer card, a display clock card, a source selector card, a data memory card, a file monitor card, a lamp test PI card, and a resistance card. The present embodiment realizes the system by a different hardware basically composed of a data processing unit, so a whole set of associated hardware should be replaced.

The portion corresponding to the control rod monitor unit 6 is composed for example of a file interface card, a scan control card, a sampling buffer card, a computer memory card, a DO card with isolate latch, and a probe data processor card. The present embodiment realizes the system by a different hardware basically composed of a data processing unit, so a whole set of associated hardware is to be replaced.

The portion corresponding to the position input unit 5 is composed for example of a file control card and a probe multiplexer card. The present embodiment is identical to the conventional system except for the transmission unit between the upper level, so application of a replacement method explained later is possible.

On introducing the system of the present embodiment to the conventional system having the above-mentioned structure, it is presupposed that the method of the control rod drive unit of the boiling water reactor (BWR) is basically invaried. When replacing an existing facility in an instrumented control system, it is common to replace the whole existing control cabinet with the new control cabinet.

However, according to the present system, the electronic circuit portion 31 for driving the control rod drive mechanism 21 and the electronic circuit portion 51 for inputting the control rod position are the same as the conventional system. Therefore, it is possible to partially replace the control cabinet according to the existing facility. In other words, according to the system of the present embodiment, there is basically no need to technically renew the control cabinet (rod drive control cabinet) equipped with the electronic circuit portion for driving the control rod drive unit.

Figure 17:
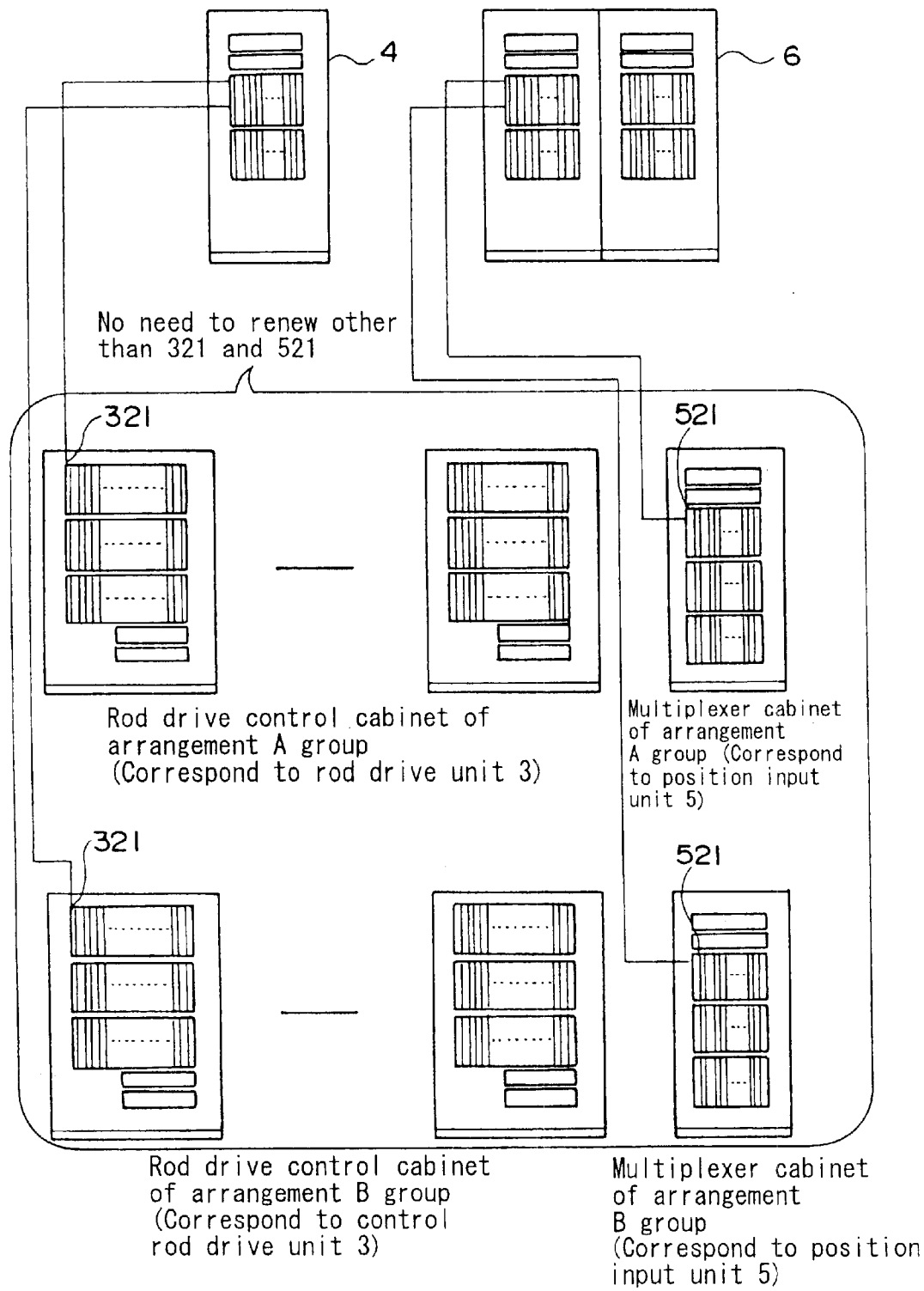
FIG. 17 is a block diagram showing the cabinet structure of the whole system after the replacement according to the present invention.

FIG. 17 shows the cabinet structure of the whole system after performing the replacement according to the present embodiment. Each of the rod control unit 4 and the rod monitor unit 6 is a duplicated system composed based on a data processing unit, and they are all new cabinets, respectively. The rod drive control cabinet corresponding to the control rod drive unit 3 and the multiplexer cabinet corresponding to the position input unit 5 are divided into two groups, configuration A and configuration B. In each cabinet, only the transmission unit 321 with ports and the position transmission unit 521 with ports are newly introduced and connected through transmission lines with the rod control unit 4 and the rod monitor unit 6.

Two methods for replacement will now be explained using as example the control cabinet (rod drive control cabinet) equipped with an electronic circuit portion for driving the rod drive unit 3. The method is similar for the control cabinet (multiplexer cabinet) equipped with an electronic circuit portion for inputting the control rod position.

According to the first method, within the control cabinet equipped with an electric circuit portion for driving the rod drive unit 3, instead of renewing the whole control cabinet including the electronic circuit portion, only the electronic circuit portion (the transmission control unit and the solenoid valve drive circuit in the system block diagram of FIG. 1) for interfacing the data transmission with a data processing unit positioned upstream is renewed (basically excluding the control cabinet case and the electric circuit portion).

Figure 18:
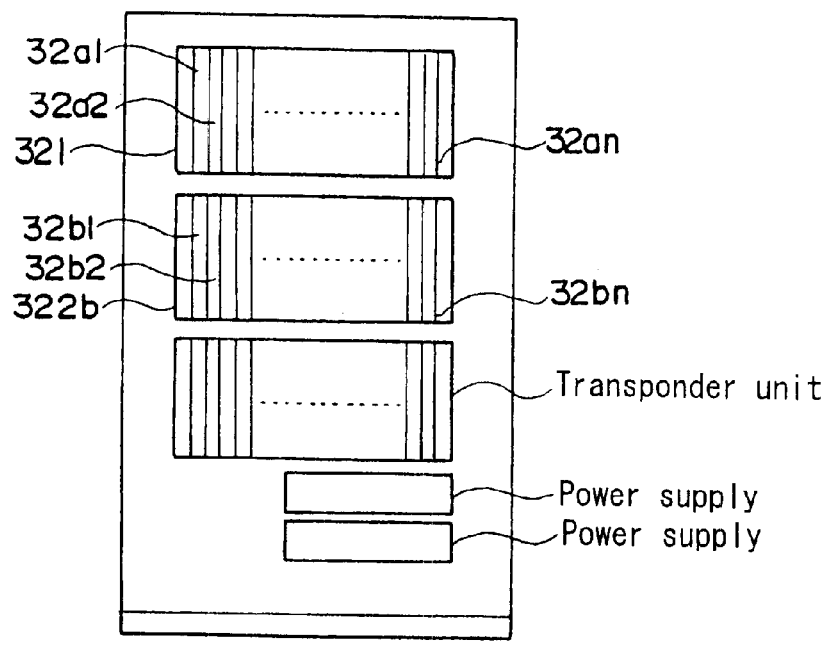
FIG. 18 is a block diagram showing the assembly of the cabinet of the control rod driving unit.

FIG. 18 shows the mounted structure of the rod drive control cabinet. The whole set of printed circuit boards (electronic circuits) mounted on a transponder unit is replaced to newly manufactured boards 321, 32a1, 32a2, . . . 32an, 322a, 32b1, 32b2, . . . 32bn, . . . .

Figure 19:
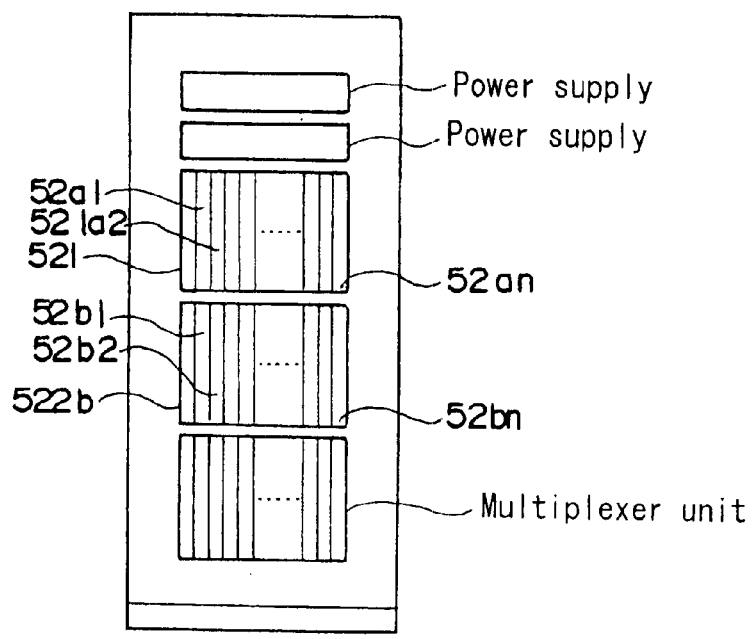
FIG. 19 is a block diagram showing the assembly of the cabinet of the position input unit.

FIG. 19 shows the mounted structure of the multiplexer cabinet. Cards for realizing the necessary functions are mounted to the cabinet, and there exists a unit for providing power voltage to cards and connecting the electric signals between cards. The whole set of printed circuit boards constituting the electronic circuit portion mounted on a unit called a multiplexer unit is the conventional system is replaced to newly manufactured boards 521, 52a1, 52a2, . . . 52an, 522a, 52b1, 52b2, . . . 52bn, . . . .

The second method is the case where only the transmission unit with ports is replaced in the control cabinet to which is mounted an electronic circuit portion for driving the control rod drive unit 3. According to this method, in FIG. 18 showing the mounting structure of the rod drive unit cabinet, only the printed circuit board 321 corresponding to the transmission unit 321 with ports and constituting the electronic circuit unit mounted to the transponder unit is replaced with a newly manufactured board.

Similarly, in the position input unit cabinet of FIG. 19, only the printed circuit board 521 constituting the electronic circuit unit mounted in the multiplexer unit is replaced with a newly manufactured board. According to the present embodiment, the replacement can be performed at low cost since the control cabinet case and the electric circuit portion are not refreshed.

Figure 20:
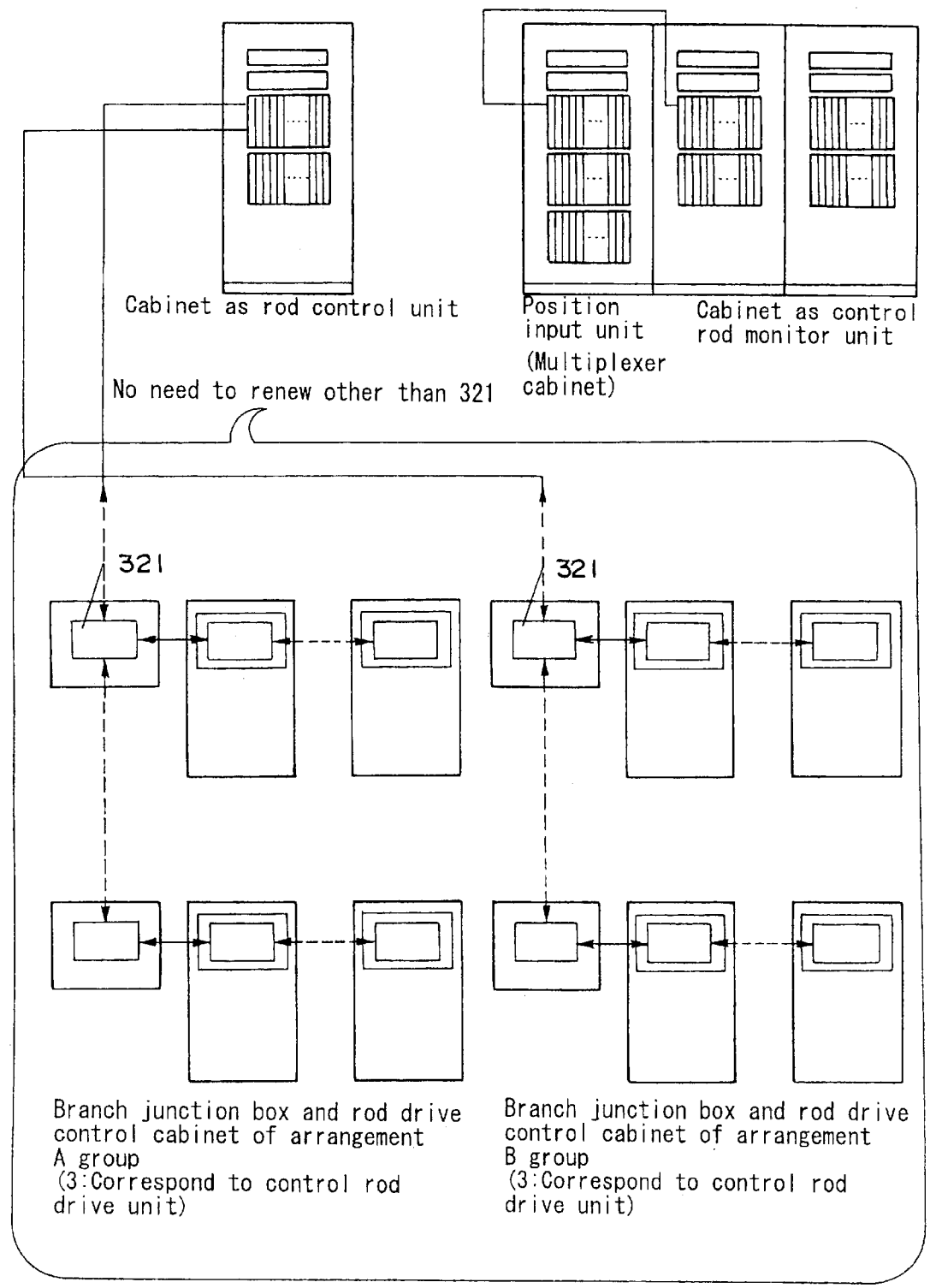
FIG. 20 is a block diagram showing the cabinet structure of the whole system after the replacement according to another embodiment.

FIG. 20 shows the cabinet structure of the whole system after the replacement according to another embodiment. The rod control unit 4 and the rod monitor unit 6 are duplicated systems basically composed of data processing units, and all the cabinets are new. Further, the multiplexer cabinet corresponding to the position input unit 5 is also a new cabinet.

The branch junction box and the transponder box corresponding to the rod drive unit 3 are divided into two groups, arrangement A and arrangement B, and the transponder unit is mounted in the hydraulic control unit which is a part of the control rod drive mechanism. Further, the branch junction unit is positioned near the hydraulic control unit. In the example, only the transmission unit 32 with ports is newly introduced and connected with the rod control unit 4 via a connection line.

Now, two methods are explained for replacing the branch junction box and the transponder box equipped with an electronic circuit unit corresponding to the control rod drive unit 3 without replacing the whole set of boxes.

The first method is the case where the electronic circuit portion for interfacing the data transmission with the data processing unit positioned upstream is replaced in the transponder box and the branch junction box equipped with the electronic circuit unit corresponding to the control rod drive unit 3 (basically excluding the box case and the electric circuit portion), without replacing the whole set of boxes including the electronic circuit unit.

Figure 21:
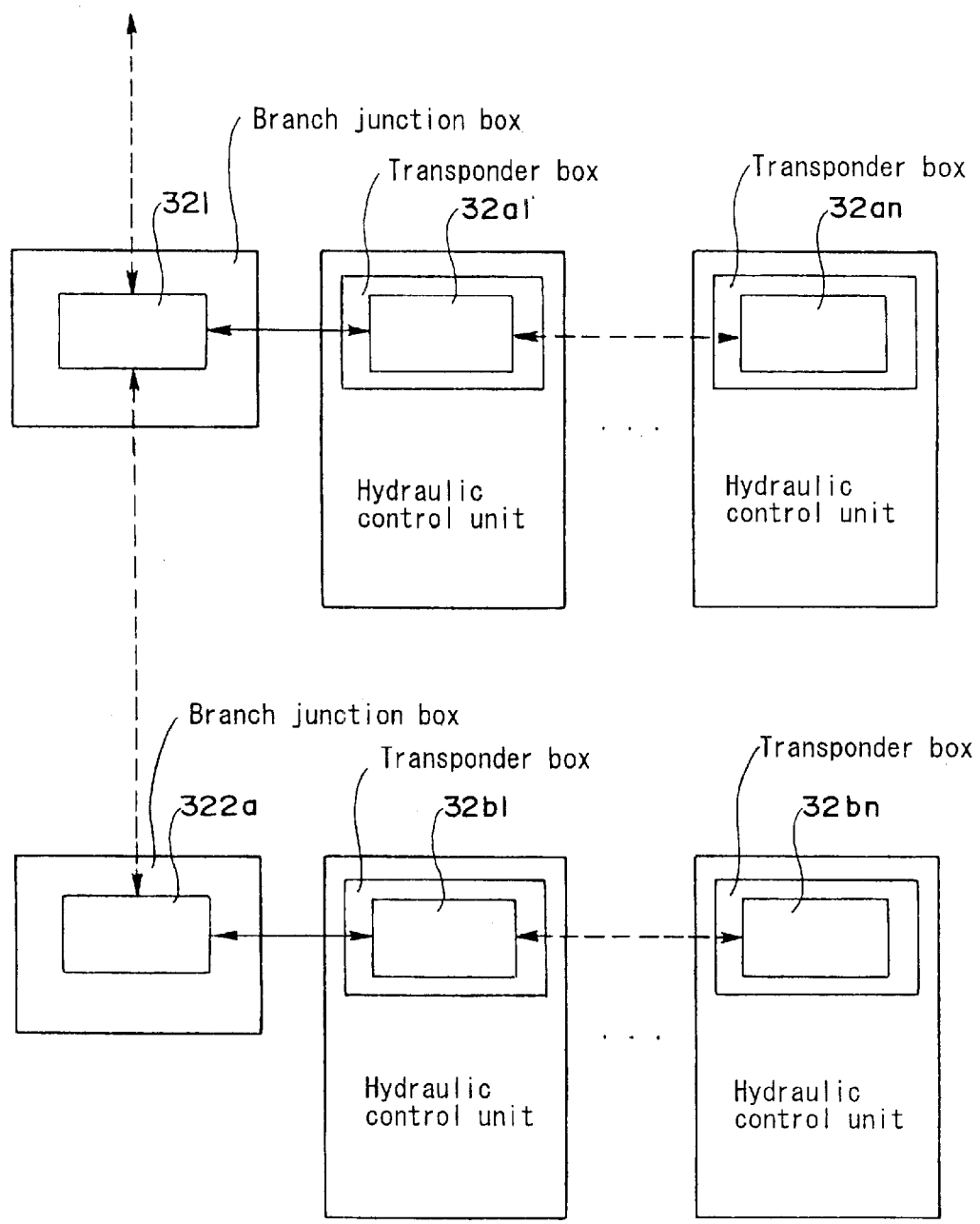
FIG. 21 is a block diagram showing the assembly of the control rod driving unit according to another embodiment.

FIG. 21 shows the mounted structure of the control rod drive unit. The whole set of printed circuit boards of the electronic circuit unit equipped within the branch junction box and the transponder box is replaced with newly manufactured boards 321, 32a1, 32a2, . . . 32an, 322a, 32b1, 32b2, . . . 32bn, . . . .

The second method is the case where only the transmission unit with ports is replaced in the branch junction box and the transponder box equipped with an electric circuit unit corresponding to the control rod drive unit 3. In this method, only the printed circuit board 321 of the electronic circuit portion mounted within the branch junction box and corresponding to the transmission unit 321 with ports, or only the box equipped with the printed circuit board 321, is replaced with a newly manufactured one. According to this method, the replacement can be performed at low cost since not all the box cases or the electric circuit portion are refreshed.

Next, the embodiment of the reactor control system according to the present invention will be explained. The above-mentioned embodiment describes the reactor manual control system presupposing that the control rod is hydraulically driven. The control rod drive unit is controlled through digital on/off signals. Therefore, the above-mentioned embodiment is not limited to manual operation but can also be operated automatically, and the embodiment can be applied to a rod control unit where the rod is driven delicately by controlling the on/off of the motor.

As for the interlock of the rod control in a boiling water reactor (BWR), only one rod is allowed to be driven at a time. Therefore, in the conventional system that does not include a data processing unit for realizing the function through software processes but where only electronic circuits are used to realize the function, the data frame of the control command only includes data corresponding to a single rod, and the electronic circuit for driving and controlling the direction control solenoid valve does not hold the control output signal. On the other hand, in an advanced boiling water reactor (ABWR), the interlock of rod control allows plural rods to be driven simultaneously (gang drive).

The following two methods are considered for the rod control system according to the present invention. The first method enables to transmit data related to a number of rods driven simultaneously to the frame of the control command data, and at the same time, enables the electronic circuit for driving the direction control solenoid valve to hold the control output signal, and to constitute the drive circuit corresponding to the specification of the circuit to be driven.

The second method only enables to transmit data corresponding to one rod being driven simultaneously in the frame of the control command data. The data corresponding to the plural rods being driven simultaneously is mounted onto the transmission frame cyclically by software operation, and the electronic circuit for controlling the direction control solenoid valve holds the control output signals corresponding to the plural rods being driven simultaneously, thereby composing the drive circuit to correspond to the specification of the circuit to be driven.

We claim:

1. A reactor manual control system of a boiling water-type nuclear reactor that controls control rods hydraulically by driving a solenoid valve, said system comprising:

an operation control having a duplicated data processing unit configured to generate a sequence pattern from the timing of the drive sequence based on manual operation information which is operated at at least two duplicated processing units at which each sequence pattern is generated;

a transmission control configured to create a command code corresponding to each control rod to be operated based on said sequence pattern, and mutually communicating each command code between other data processing units being duplicated, thereby computing AND logic within a predetermined time deviation, and when the computed result corresponds, transmitting the selected command code;

a transmission unit configured to receive said command code and perform protocol conversion thereto, and transmitting the same as control command to a plurality of downstream transmission branch portions, wherein the command code is created respectively based on each generated sequence pattern; and a solenoid valve drive circuit being branched from said transmission branch portion and being configured to drive the control rod drive unit of each control rod.

2. A reactor manual control system according to claim 1, wherein when a control rod number is designated, said protocol conversion is performed by reading out an excitation command code corresponding to the row/column address of said number from a RAM storing said command code, and transmitting the same through a shift register in serial signals, and the protocol conversion performs signal conversion based on signals of the transmission control to drive the solenoid value drive circuit.

3. A reactor manual control system according to claim 2, wherein said transmission control is equipped with a bypass means for outputting only the command code of the other side corresponding to the forced transmission request output when one side of said command codes is abnormal.

4. A reactor manual control system according to claim 3, further comprising:

a plurality of position input circuits for inputting coded on/off signals of a position detecting mechanism equipped to correspond to each control rod;

a position transmission unit for transmitting the position data in the form of serial signals to a transmission branch unit positioned upstream from said plurality of position input circuits, and further transmitting said position information upstream;

a rod position monitor unit for receiving said data and mutually communicating said data between duplicated data processing units, and performing software processes to said rod position information at other duplicated data processing units; and a rod position monitor unit including a means for selecting and displaying one of said duplicated rod position data.

5. A reactor manual control system of a boiling water-type nuclear reactor that controls control rods hydraulically by driving a solenoid valve, said system comprising:

a cabinet constituting a rod control unit renewed including an operation control configured to have a duplicated data processing unit for generating a sequence pattern based on the manual control information; and a transmission control configured to create a command code for every control rod to be controlled based on said sequence pattern, computing an AND logic by mutually communicating each command code between duplicated data processing units, and when the result coincides, transmitting a selected command code; and a rod drive control cabinet constituting a control rod drive unit including a new transmission unit that receives said command code and performs protocol conversion thereto, and transmits the same as control command to the plurality of transmission branch units positioned downstream, and a solenoid valve drive circuit realized by a special-purpose electric circuit branched from said transmission branch unit for driving the control rod drive unit corresponding to each rod.

6. A reactor manual control system according to claim 5, further comprising:

a cabinet constituting a control rod monitor unit renewed including a position monitor unit for receiving data and performing software processes to the control rod position information at said duplicated data processing units, and a means for selecting and displaying one of the duplicated control rod position data; and a multiplexer cabinet constituting a position input unit including a plurality of position input circuits comprising special-purpose electric circuits to which are input coded on/off signals transmitted from position detecting mechanisms equipped to correspond to each control rod, and a new position transmission unit that transmits data to said control rod monitor unit from said plural position input circuits via a transmission branch unit positioned upstream and further via branched lines.

7. A reactor manual control system that manually or automatically sets the selection of control rods to be operated out of the plural control rods equipped in the reactor, the direction of movement (withdrawal or insertion) of each rod, and the method of driving said rods, said system comprising:

a rod control unit for creating as data in duplicated data processing units the drive timing of the control rod set either manually or automatically, and mutually communicating said duplicated data between another duplicated data processing units, performing an AND logic within a predetermined time difference, and selecting and transmitting one of the control command data based on the computed result of said AND logic, wherein same information on the drive timing is operated at more than two of the duplicated data processing units and each data created thereat; and a rod drive unit that upon receiving said selected control command, transmits said data as serial signals to a plurality of transmission branch units positioned downstream, and drives the control rod drive unit corresponding to each control rod being branched from said transmission branch unit.

* * * * *